(12) United States Patent
Yadav et al.

(10) Patent No.: US 11,336,471 B2
(45) Date of Patent: May 17, 2022

(54) ACHIEVING SEAMLESS SERVICE DURING UNREACHABILITY OF CHARGING FUNCTION ENTITY

(71) Applicant: Cisco Technology, Inc., San Jose, CA (US)

(72) Inventors: Mukesh Yadav, Bangalore (IN); Shivakumar Nithiyanantham, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/723,003

(22) Filed: Dec. 20, 2019

(65) Prior Publication Data

US 2021/0194709 A1   Jun. 24, 2021

(51) Int. Cl.
| | | |
|---|---|---|
| G06F 15/173 | (2006.01) | |
| H04L 12/14 | (2006.01) | |
| H04L 29/06 | (2006.01) | |
| H04L 69/28 | (2022.01) | |
| H04L 47/70 | (2022.01) | |

(52) U.S. Cl.
CPC .......... *H04L 12/1407* (2013.01); *H04L 47/82* (2013.01); *H04L 63/10* (2013.01); *H04L 69/28* (2013.01)

(58) Field of Classification Search
CPC ..... H04L 12/1407; H04L 47/82; H04L 63/10; H04L 69/28
USPC ................................................ 709/226, 227
See application file for complete search history.

(56) References Cited

U.S. PATENT DOCUMENTS

| | | | | |
|---|---|---|---|---|
| 6,256,664 B1 * | 7/2001 | Donoho | ................. | G06Q 10/10 709/204 |
| 8,316,101 B2 * | 11/2012 | Ammerlaan | ............ | G06F 9/505 709/217 |
| 8,429,652 B2 * | 4/2013 | Muthiah | ................. | G06F 9/505 718/1 |

(Continued)

FOREIGN PATENT DOCUMENTS

| | | |
|---|---|---|
| WO | 2019011794 A1 | 1/2019 |
| WO | 2019095726 A1 | 5/2019 |
| WO | 2019157873 A1 | 8/2019 |

OTHER PUBLICATIONS

Cisco Systems, Inc., "HA Administration Guide, StarOS Release 20", Mar. 31, 2016, 330 pages.

(Continued)

*Primary Examiner* — Thu Ha T Nguyen
(74) *Attorney, Agent, or Firm* — Edell, Shapiro & Finnan, LLC (57) ABSTRACT

In one example, a session management function entity is configured to obtain an indication of a backup resource usage quota associated with a rating group of a user session for a user equipment configured to communicate via a mobile core network. The rating group is subject to online charging. The session management function entity determines that a charging function entity configured to provide an indication of a primary resource usage quota associated with the rating group is unreachable. In response to determining that the charging function entity is unreachable, the session management function entity allocates the backup resource usage quota associated with the rating group while the charging function entity is unreachable.

20 Claims, 8 Drawing Sheets

(56) References Cited

U.S. PATENT DOCUMENTS

| | | | | |
|---|---|---|---|---|
| 8,769,059 | B1* | 7/2014 | Chheda | H04L 41/0866 709/220 |
| 8,818,327 | B2* | 8/2014 | Shaikh | H04L 65/1036 455/405 |
| 8,954,574 | B1* | 2/2015 | Chheda | G06Q 20/085 709/224 |
| 9,087,319 | B2* | 7/2015 | Nguyen | H04L 12/14 |
| 10,044,879 | B1* | 8/2018 | Oded | H04M 15/42 |
| 10,334,116 | B2 | 6/2019 | Yan et al. | |
| 10,958,794 | B2* | 3/2021 | Chai | H04W 4/24 |
| 2002/0065884 | A1* | 5/2002 | Donoho | H04L 67/20 709/204 |
| 2004/0261116 | A1* | 12/2004 | Mckeown | H04L 43/00 725/109 |
| 2007/0280447 | A1* | 12/2007 | Cai | H04M 15/785 379/114.03 |
| 2008/0010352 | A1* | 1/2008 | Donoho | G06Q 30/02 709/206 |
| 2009/0276386 | A1* | 11/2009 | Greening | H04L 47/15 706/47 |
| 2009/0288084 | A1* | 11/2009 | Astete | G06Q 30/0601 718/1 |
| 2010/0094999 | A1* | 4/2010 | Rama | G06F 9/5011 709/225 |
| 2010/0306383 | A1* | 12/2010 | Luzzatti | H04L 67/104 709/226 |
| 2011/0010457 | A1* | 1/2011 | Tanttu | H04M 15/53 709/226 |
| 2011/0010581 | A1* | 1/2011 | Tanttu | G06F 9/5038 714/11 |
| 2011/0067085 | A1* | 3/2011 | Brouard | H04L 12/1403 726/1 |
| 2012/0081557 | A1* | 4/2012 | Kupinsky | H04L 12/1407 348/207.1 |
| 2012/0095858 | A1* | 4/2012 | Dunstan | G06Q 30/0601 705/26.1 |
| 2012/0129488 | A1* | 5/2012 | Patterson | H04M 15/66 455/406 |
| 2012/0166618 | A1* | 6/2012 | Dahod | H04L 67/148 709/224 |
| 2013/0132854 | A1* | 5/2013 | Raleigh | H04W 4/60 715/738 |
| 2013/0254402 | A1* | 9/2013 | Vibhor | G06F 9/5072 709/226 |
| 2014/0016614 | A1* | 1/2014 | Velev | H04W 76/38 370/331 |
| 2014/0040975 | A1* | 2/2014 | Raleigh | G06Q 30/016 726/1 |
| 2014/0056182 | A1* | 2/2014 | Chai | H04W 4/24 370/259 |
| 2014/0171022 | A1* | 6/2014 | Kiene | H04M 15/80 455/408 |
| 2014/0337442 | A1* | 11/2014 | Zhuang | H04L 51/066 709/206 |
| 2015/0089068 | A1* | 3/2015 | Islam | H04L 41/5045 709/226 |
| 2015/0120938 | A1* | 4/2015 | Mordani | G06F 8/20 709/226 |
| 2015/0120939 | A1* | 4/2015 | Islam | H04L 41/5045 709/226 |
| 2015/0121483 | A1* | 4/2015 | Perez | H04L 41/50 726/5 |
| 2015/0319315 | A1* | 11/2015 | Chai | H04M 15/62 455/406 |
| 2015/0372881 | A1* | 12/2015 | Bellomo | H04L 67/10 709/226 |
| 2016/0164752 | A1* | 6/2016 | Larsson | H04M 15/785 455/408 |
| 2016/0255159 | A1* | 9/2016 | Beasley | G06Q 20/28 709/226 |
| 2017/0163821 | A1* | 6/2017 | Payette | H04M 15/8214 |
| 2017/0178193 | A1* | 6/2017 | Jagannath | G06Q 30/0273 |
| 2017/0180969 | A1* | 6/2017 | Chai | H04L 12/1403 |
| 2017/0188001 | A1* | 6/2017 | Berger | G06Q 30/0264 |
| 2017/0201850 | A1* | 7/2017 | Raleigh | G06F 3/0482 |
| 2017/0235848 | A1* | 8/2017 | Van Dusen | G06F 16/904 705/12 |
| 2018/0262930 | A1 | 9/2018 | da Silva et al. | |
| 2019/0102709 | A1* | 4/2019 | Correa | G06N 20/00 |
| 2019/0259097 | A1* | 8/2019 | Raleigh | G06Q 20/0855 |
| 2020/0220982 | A1* | 7/2020 | Chai | H04M 15/785 |

OTHER PUBLICATIONS

Cisco Systems, Inc., "Gy Interface Support", P-GW Administration Guide, StarOS Release 21, downloaded from the Internet Dec. 13, 2019, 44 pages.

3GPP, "3rd Generation Partnership Project; Technical Specification Group Services and System Aspects; Telecommunication management; Charging management; 5G system, charging service; Stage 3 (Release 16)", 3GPP TS 32.291 V16.1.1, Sep. 2019, 102 pages.

H. Hakala et al., "Diameter Credit-Control Application", Network Working Group, Request for Comments: 4006, Category: Standards Track, Aug. 2005, 114 pages.

F5 Networks, Inc., "Manual Chapter : Configuring Quota Management using Rating Groups", https://techdocs.f5.com/kb/en-us/products/big-ip-pem/manuals/product/pem-implementations-13-0-0/5.html, downloaded from the Internet Oct. 23, 2019, 4 pages.

3GPP, "3rd Generation Partnership Project; Technical Specification Group Service and System Aspects; Telecommunication management; Charging management; Diameter charging applications (Release 8)", 3GPP TS 32.299 V8.9.0, Dec. 2009, 142 pages.

ETSI, "5G; Telecommunication management; Charging management; 5G data connectivity domain charging; stage 2 (3GPP TS 32.255 version 15.0.0 Release 15)", ETSI TS 132 255 V15.0.0, Oct. 2018, 77 pages.

ETSI, "5G; 5G System; Session Management Policy Control Service; Stage 3 (3GPP TS 29.512 version 15.0.0 Release 15)", ETSI TS 129 512 V15.0.0, Jun. 2018, 83 pages.

Juniper Networks, Inc., "Junos® OS", Broadband Subscriber Sessions Feature Guide, Sep. 25, 2019, 2134 pages.

ETSI, "5G; Telecommunication management; Charging management; 5G system; Services, operations and procedures of charging using Service Based Interface (SBI) (3GPP TS 32.290 version 15.1.0 Release 15)", ETSI TS 132 290 V15.1.0, Oct. 2018, 26 pages.

Tovinger, Thomas, "Management, Orchestration and Charging for 5G networks", https://www.3gpp.org/news-events/1951-sa5_5g, Mar. 22, 2018, 7 pages.

3GPP, "3rd Generation Partnership Project; Technical Specification Group Services and System Aspects; Telecommunication management; Charging management; Charging architecture and principles (Release 11)", 3GPP TS 32.240 V11.0.0, Mar. 2011, 45 pages.

Törnkvist, Robert et al., "Charging and Billing Architecture for 5G Network", downloaded from the Internet Oct. 21, 2019, 10 pages.

\* cited by examiner

```
Charging Data Resp {
    InvocationResult
    InvocationSequenceNumber
    RetainTimer
    MultipleUnitInfo [
        {
            RatingGroup  X
            CommFailureQuota
            RetainTimer
        },
        {
            RatingGroup  Y
            CommFailureQuota
            RetainTimer
        },
        {
            RatingGroup  Z
        },
    ]
}
```

```
Charging Data Req {
    Multiunitusage [
    {
        RatingGroup X
        Usedunitcontainer {
            Commfailurereport
        }
    }
    ]
}
```

ACHIEVING SEAMLESS SERVICE DURING UNREACHABILITY OF CHARGING FUNCTION ENTITY

TECHNICAL FIELD

The present disclosure relates to computer networks.

BACKGROUND

Online charging is a process that involves collecting charging information for resource usage (e.g., data consumption) concurrently with that resource usage. In online charging, the network can send a charging data request, and, in response, receive an appropriate resource usage authorization. The resource usage authorization may include a resource usage quota that limits the scope of the authorization (e.g., volume of data or duration). As such, the network may need to renew the authorization from time-to-time as long as the resource usage persists.

DESCRIPTION OF EXAMPLE EMBODIMENTS

Overview

In one example embodiment, a session management function entity is configured to obtain an indication of a backup resource usage quota associated with a rating group of a user session for a user equipment configured to communicate via a mobile core network. The rating group is subject to online charging. The session management function entity determines that a charging function entity configured to provide an indication of a primary resource usage quota associated with the rating group is unreachable. In response to determining that the charging function entity is unreachable, the session management function entity allocates the backup resource usage quota associated with the rating group while the charging function entity is unreachable.

Example Embodiments

Figure 1A:
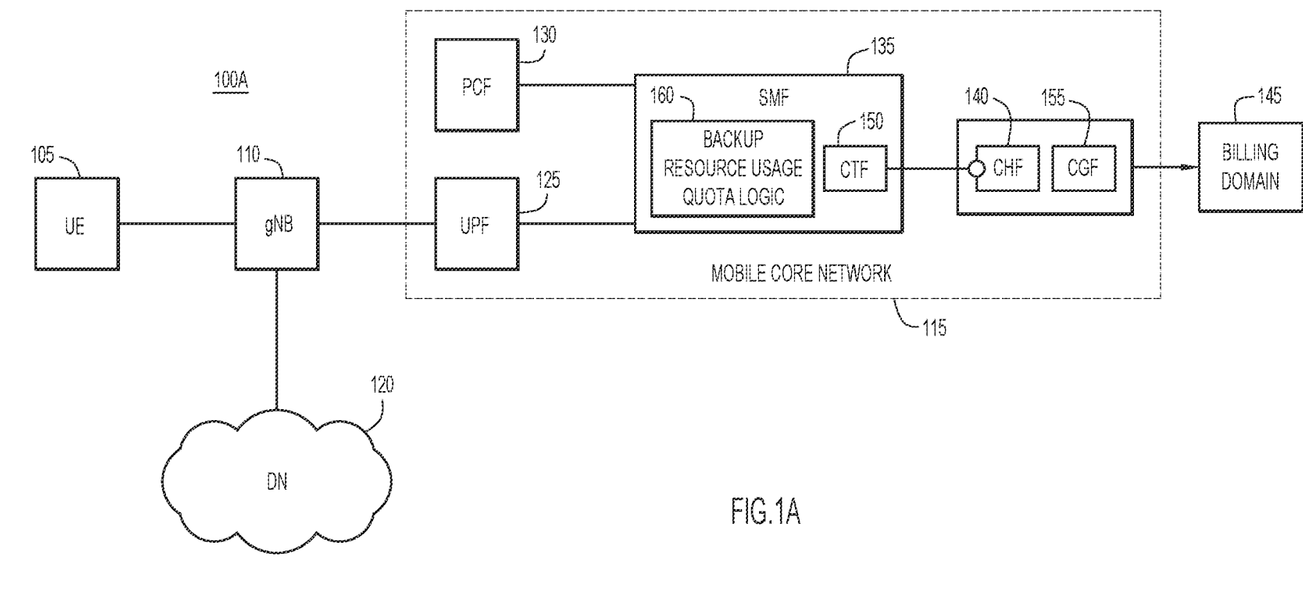
FIGS. 1A-1C illustrate respective alternative systems configured for allocating a backup resource usage quota associated with a rating group while a charging function entity is unreachable, according to example embodiments.
Figure 1B:
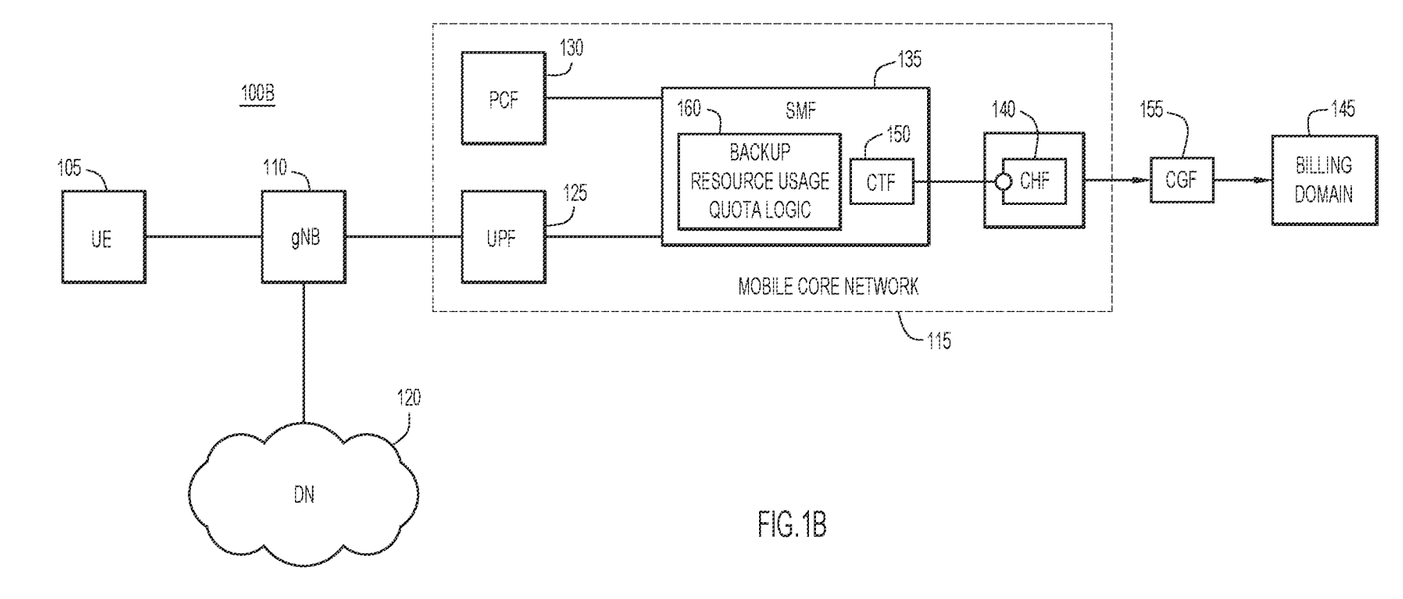
Figure 1C:
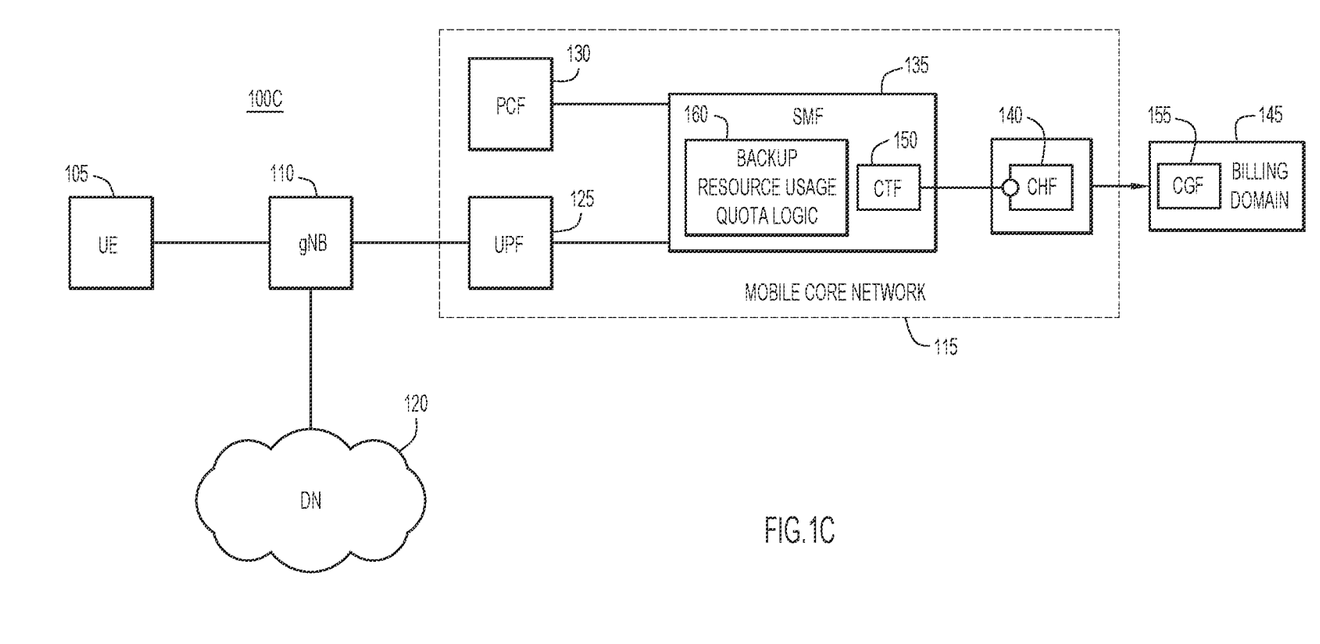

FIGS. 1A-1C illustrate respective example alternative systems 100A-100C configured for allocating a backup resource usage quota. Systems 100A-100C include a User Equipment (UE) 105, gNodeB (gNB) 110, mobile core network 115, and Data Network (DN) 120. UE 105 may be configured to communicate with DN 120 via mobile core network 115. UE 105 may be a mobile phone, laptop, or any other suitable user device, and DN 120 may be the Internet in one example. gNB 110 may be a base station entity configured to enable communication between UE 105 and mobile core network 115.

Mobile core network 115 may include User Plane Function (UPF) 125, Policy Control Function (PCF) 130, Session Management Function (SMF) 135, and Charging Function (CHF) 140. UPF 125 supports packet routing and forwarding between gNB 110 and DN 120 on behalf of UE 105. PCF 130 provides policy rules to SMF 135, which may perform session management operations (e.g., session establishment, modification, and/or release) based thereon. CHF 140 may support charging-based resource usage based on information obtained from billing domain 145, which may be managed by a network service provider. SMF 135 may host Charging Trigger Function (CTF) 150, which is configured to communicate with CHF 140. CHF 140 is configured to communicate with billing domain 145 through Charging Gateway Function (CGF) 155. CGF 155 may be integrated with CHF 140 (system 100A), external to CHF 140 and billing domain 145 (system 100B), or integrated with billing domain 145 (system 100C).

In this example, UE 105 has established a user session to communicate with DN 120. The user session may include one or more rating groups, which may be logical categorizations of network traffic based on a task or tasks performed by the network traffic. For example, there may be a first rating group for network traffic dedicated to a voice call, a second rating group for network traffic dedicated to video streaming, a third rating group for network traffic dedicated to downloads, a fourth rating group for network traffic dedicated to Internet browsing, etc. The rating groups may be subject to online charging, which is structured using SMF 135 in collaboration with UPF 125, PCF 130, and CHF 140.

Initially, SMF 135 obtains, from PCF 130, charging data such as specific rating groups, the charging method (e.g., online charging or offline charging), and the metering units to be used in charging reports (e.g., volume (e.g., MB), time (e.g., seconds), or both). SMF 135 also obtains, from CHF 140, a primary resource usage quota (e.g., 1 GB) associated with a given rating group. SMF 135 provides the primary resource usage quota to UPF 125. This permits UE 105 to communicate based on the primary resource usage quota for the given rating group. Before the primary resource usage quota expires (e.g., before 1 GB is consumed for the given rating group), SMF 135 obtains, from UPF 125, an indication that the primary resource usage quota will soon expire. SMF 135 provides the indication to CHF 140, which provides another primary resource usage quota (e.g., 1 GB) to SMF 135. This online charging process may repeat for as long as the user session of UE 105 remains active, or until the pre-paid funds for resource usage for the given rating group runs out.

Transient/intermittent network failures can occur between SMF 135 and CHF 140. Such network failures can be caused by a heavy network load on an interface of SMF 135, for example during a burst of data exchanges. This may prevent SMF 135 from sending the indication that the primary resource usage quota will expire soon. Transient network failures between SMF 135 and CHF 140 can also be caused by a heavy application load at CHF 140. For example, SMF 135 may successfully send the indication that the primary resource usage quota will expire soon, but the heavy application load may preclude CHF 140 from processing the indication or from communicating with an Online Charging System (OCS) server in billing domain 145.

When a transient network failure occurs between SMF 135 and CHF 140, SMF 135 is unable to obtain updated primary resource usage quotas from CHF 140. Conventionally, in this situation SMF 135 would either permit the communications associated with the rating group in question to continue without a primary resource usage quota or terminate the communications. This would cause a disruption at UE 105, particularly for real-time traffic such as voice calls. Furthermore, programming SMF 135 to fall back to one or more alternative CHFs negotiated during Protocol Data Unit (PDU) session establishment would not adequately address this problem because transient network failure may occur for all CHFs simultaneously, including the alternative CHF(s).

Even if an operator provides a secondary resource usage quota to SMF 135 for use in case of transient network failure between SMF 135 and CHF 140, the secondary resource usage quota is a single value that applies at the user session level, rather than the rating group level, because the rating groups are initially unknown at SMF 135. Applying the secondary resource usage quota at the user session level can negatively impact individual rating groups that are part of the same user session. For example, if the secondary resource usage quota is 100 MB for the user session, that quota would need to cover all rating groups associated with the user session (e.g., voice call, video streaming, downloads, and Internet browsing). The voice call might consume only 5 MB in five seconds, but the video stream or the file download might consume all 100 MB (i.e., the entire secondary resource usage quota) in the same time span. Thus, allocating the secondary resource usage quota on a per-session basis would cause the voice call to drop because of the network traffic servicing the video stream or file download.

Accordingly, backup resource usage quota logic 160 is provided at SMF 135 to intelligently allocate bandwidth during transient network failures. Briefly, SMF 135 may obtain an indication of a backup resource usage quota associated with a rating group of a user session for UE 105. SMF 135 may determine that CHF 140 is unreachable, and, in response, allocate the backup resource usage quota while CHF 140 is unreachable. Thus, backup resource usage quota logic 160 enables SMF 135 to provide a backup resource usage quota on a rating group level basis rather than a user session level basis.

The backup resource usage quota may selectively service data corresponding to a given rating group. This allows different rating groups to have different backup resource usage quotas depending on the volume of traffic consumed by individual rating groups. Such granularity may provide an advantage where an operator wishes to block traffic associated with a heavy Service Data Flow (SDF), but wants to provide seamless real-time service for rating groups associated with small traffic volumes (lighter SDFs). In particular, these techniques may minimize UE detaches/reattaches due to transient network failures, and may further prevent disruptions in real-time applications, particularly those that command relatively small amounts of network traffic. A given backup resource usage quota may be any suitable value (e.g., relatively small, medium, or large), depending on the corresponding rating group (e.g., the network traffic typically experienced in a given rating group).

Figure 2:
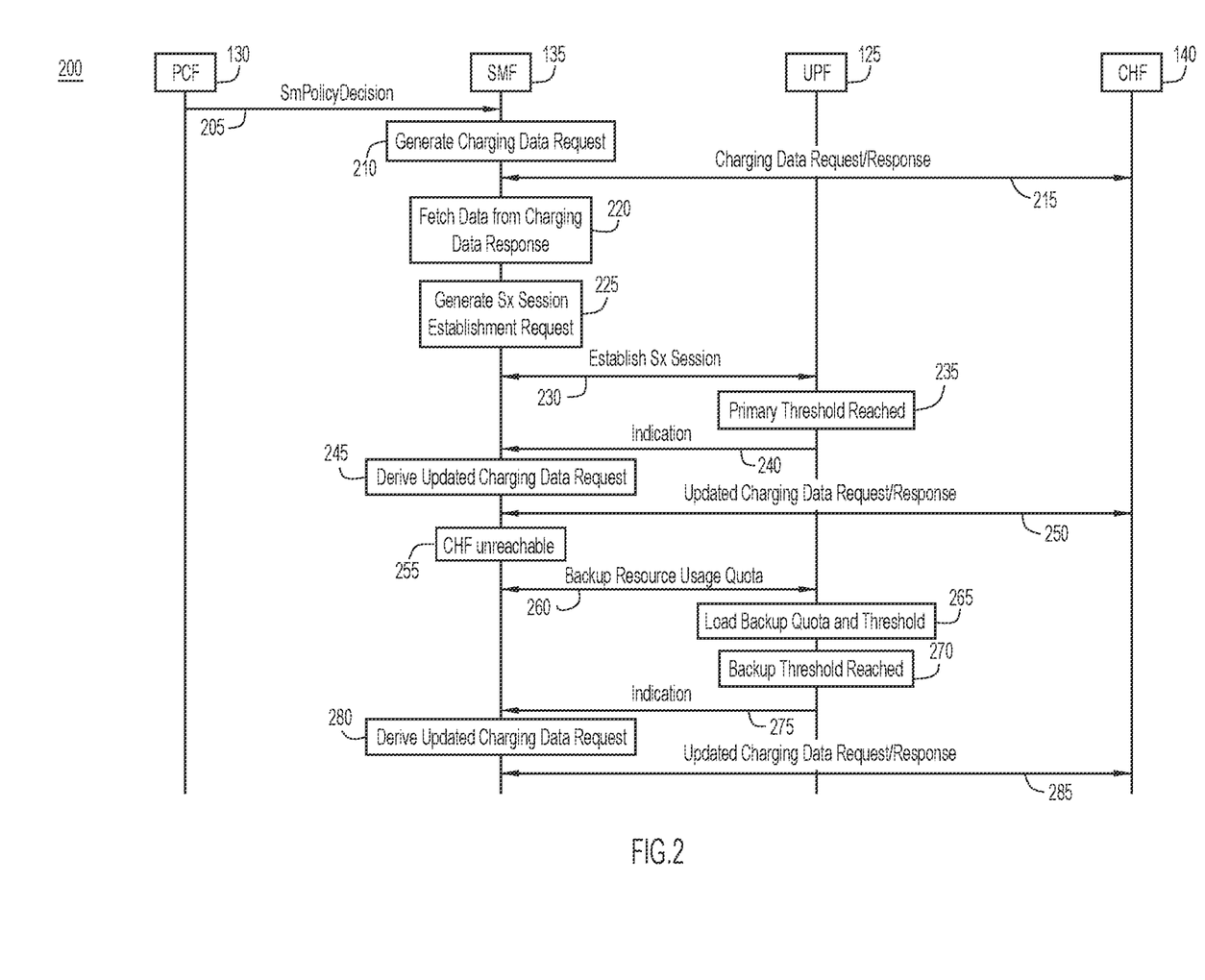
FIG. 2 illustrates a call flow of a method for allocating a backup resource usage quota associated with the rating group while the charging function entity is unreachable, according to an example embodiment.

Turning now to FIG. 2, and with continued reference to FIG. 1, shown is a call flow of an example method 200 for allocating a backup resource usage quota. Operations of method 200 may be performed by UPF 125, PCF 130, SMF 135, and CHF 140. At 205, SMF 135 obtains, from PCF 130, charging data in the form of an SmPolicyDecision that includes specific rating groups, the charging method, and metering units for charging reports. At 210, SMF 135 generates a charging data request to obtain, among other data, a backup resource usage quota associated with a rating group of a user session for UE 105. At 215, SMF 135 provides the charging data request and obtains a charging data response including an indication of the backup resource usage quota.

At 220, SMF 135 fetches data from the charging data response. In addition to the backup resource usage quota, the charging data response may also include an indication of a primary resource usage quota, and an indication of a primary threshold amount of resource usage, an indication of a backup threshold amount of resource usage, and an indication of an expiration of a timer for the backup resource usage quota. For example, the primary resource usage quota may be 1 GB, the primary threshold amount of resource usage may be 800 MB, the backup resource usage quota may be 100 MB for a rating group corresponding to a video stream, the backup threshold amount of resource usage may be 80 MB, and the timer may expire after five seconds. SMF 135 may store the backup resource usage quota, the backup threshold amount of resource usage, and the expiration of the timer for the backup resource usage quota locally.

At 225, SMF 135 generates an Sx session establishment request. The Sx session establishment request may include definitions for one or more Packet Detection Rules (PDRs), which identify traffic based on, e.g., source Internet Protocol (IP) address, destination IP address, port number, etc. PDRs may help distinguish between video traffic, voice traffic, website browsing traffic, etc. The Sx session establishment request may also define one or more Forwarding Action Rules (FARs), which identifies an action to be performed on the associated traffic (e.g., forward, drop, buffer, etc.). Each PDR may be associated with a FAR ID, which indicates the action. The Sx session establishment request may also identify one or more Usage Reporting Rules (URRs), which describes what information to report and when (e.g., metering units, quotas, thresholds, etc.).

In the following example Sx session establishment request, PDR1 may correspond to a rating group for video traffic and PDR2 may correspond to a rating group for a voice call. As shown, the primary resource usage quota is 1 GB, and the primary threshold is 800 MB.

Create PDR:
PDR ID: PDR1
FAR ID: FAR1
URR ID: URR1
Create PDR:
PDR ID: PDR2
FAR ID: FAR1
URR ID: URR1
Create FAR:
FAR ID: FAR1
FAR ID: FAR2
Create URR:
URR ID: URR1
Measurement method: Volume (MB)
Primary Resource Usage Quota: 1000
Primary Threshold: 800

At 230, SMF 135 establishes the Sx session at UPF 125. In particular, UPF 125 is configured to permit 1 GB of network traffic between UE 105 and DN 120. At 235, UPF 125 determines that the amount of actual resource usage is equal to or greater than the primary threshold amount of resource usage (here, 800 MB). Accordingly, at 240, SMF 135 obtains, from UPF 125, an indication that the amount of the actual resource usage is equal to or greater than the primary threshold amount of resource usage. SMF 135 may obtain the indication as part of a Packet Forwarding Control Protocol (PFCP) session report that includes a usage report for URR1.

At 245, in response to obtaining the indication that the amount of the actual resource usage is equal to or greater than the primary threshold amount of resource usage, SMF 135 generates an updated charging data request from the usage report. At 250, SMF 135 attempts to provide the updated charging data request to CHF 140 in order to obtain an updated primary resource usage quota. At 255, SMF 135 determines that CHF 140 is unreachable, and, therefore, is unable to provide the updated primary resource usage quota. In response to determining that CHF 140 is unreachable, SMF 135 derives the backup resource usage quota (e.g., 100 MB), and, at 260, provides an indication of the backup resource usage quota to UPF 125. SMF 135 may provide the indication of the backup resource usage quota by modifying the Sx session. SMF 135 may also provide the backup threshold amount of resource usage (e.g., 80 MB).

At 265, UPF 125 loads the backup resource usage quota and backup threshold amount of resource usage. In particular, UPF 125 is now configured to permit 100 MB of video traffic for the associated rating group. At 270, UPF 125 determines that the amount of actual resource usage is equal to or greater than the backup threshold amount of resource usage (here, 80 MB). Accordingly, at 275, SMF 135 obtains, from UPF 125, an indication that the amount of the actual resource usage is equal to or greater than the backup threshold amount of resource usage. SMF 135 may obtain the indication as part of a PFCP session report that includes a usage report for the corresponding URR.

At 280, in response to obtaining the indication that the amount of the actual resource usage is equal to or greater than the backup threshold amount of resource usage, SMF 135 generates an updated charging data request from the usage report. At 285, SMF 135 attempts to provide the updated charging data request to CHF 140 in order to obtain an updated primary resource usage quota. SMF 135 may also attempt to provide a usage report to CHF 140. SMF 135 obtains a charging data response (including the updated primary resource usage quota) from CHF 140, determines that the charging function entity is reachable, and permits the flow to continue based on the updated primary resource usage quota. It will be appreciated that similar operations may apply for any suitable number of rating groups having respective backup resource usage quotas associated therewith (e.g., video streaming traffic, voice call traffic, etc.).

Figure 3:
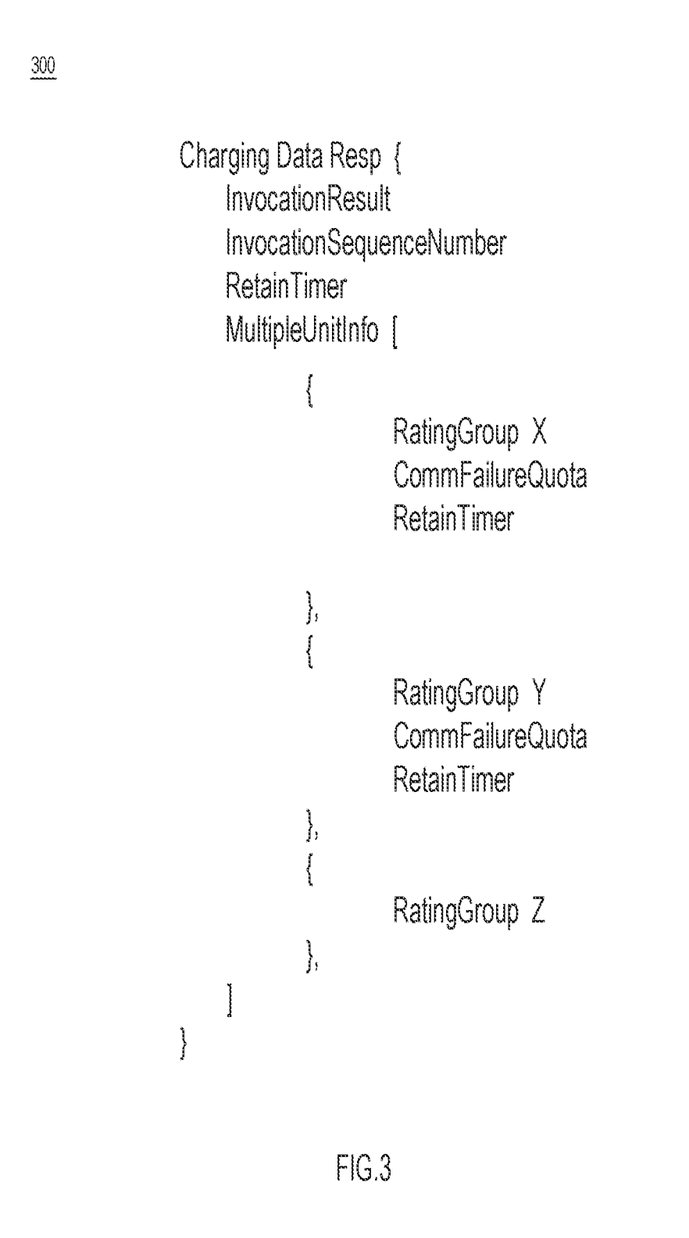
FIG. 3 illustrates a charging data response that includes dedicated Information Elements (IEs) for a backup resource usage quota and a timer for the backup resource usage quota, according to an example embodiment.

Turning now to FIG. 3, and with continued reference to FIGS. 1 and 2, shown is an example charging data response 300 that includes dedicated Information Elements (IEs) for a backup resource usage quota and a timer for the backup resource usage quota. Charging data response 300 may be provided from CHF 140 to SMF 135 as part of operation 215 (FIG. 2), for example. Charging data response 300 may include an indication of a backup resource usage quota for rating group X (e.g., video traffic) under "MultipleUnitInfo," represented as the dedicated IE "CommFailureQuota" under "RatingGroup X." Charging data response 300 may also include an indication of a backup resource usage quota for rating group Y (e.g., voice call traffic) under "MultipleUnitInfo," represented as the dedicated IE "CommFailureQuota" under "RatingGroup Y."

Charging data response 300 also includes an indication of an expiration of a timer for the backup resource usage quota. Charging data response 300 may include an indication of a timer for rating group X, represented as the dedicated IE "RetainTimer" under "RatingGroup X." Charging data response 300 may also include an indication of a backup resource usage quota for rating group Y, represented as the dedicated IE "RetainTimer" under "RatingGroup Y." Charging data response 300 may also/alternatively include an indication of a timer for the session level, represented as the dedicated IE "RetainTimer" under the "CommFailureQuota" for the session level.

SMF 135 may start the relevant timer upon allocation of the backup resource usage quota. The timer may be long enough to outlast any intermittent network failure. Whenever SMF 135 obtains a usage report or indication from UPF 125 while the timer is active, SMF 135 may attempt to reconnect to CHF 140. If SMF 135 subsequently determines that the timer has expired, SMF 135 may revoke allocation of the backup resource usage quota. SMF 135 may take any number of actions upon expiration of the timer, such as permitting traffic associated with the rating group without a quota, ending the user session (e.g., dropping a voice call), attempting to communicate with a backup CHF, etc.

Figure 4:
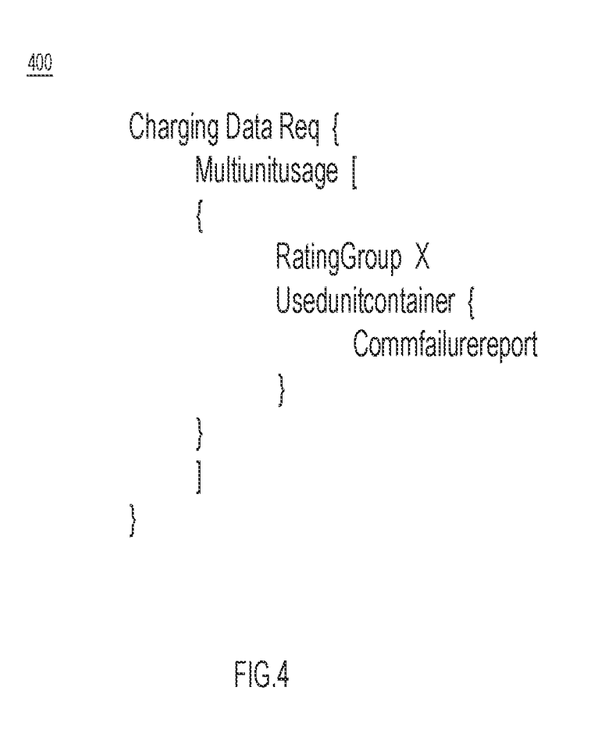
FIG. 4 illustrates a charging data request that includes a dedicated IE for an indication of an amount of actual resource usage under a backup resource usage quota associated with a rating group, according to an example embodiment.

FIG. 4 illustrates an example charging data request 400 that includes a dedicated IE for an indication of an amount of actual resource usage under the backup resource usage quota. Charging data request 400 may be provided from SMF 135 to CHF 140 as part of operation 285 (FIG. 2), for example. Charging data request 400 may include an indication of an amount of actual resource usage under the backup resource usage quota associated rating group X (e.g., video traffic), represented as the dedicated IE "Commfailurereport" bool in "Usedunitcontainer" under "Multiunitusage." This feature may be particularly useful where, for a given session, SMF 135 is not configured to notify PCF 130 of a credit management failure.

Consider the scenario where CHF 140 allocates 1 GB as the primary resource usage quota, 800 MB of which was actually consumed, and 100 MB as the backup resource usage quota, 80 MB of which was actually consumed. SMF 135 may indicate to CHF 140 that 800 MB was consumed from the primary resource usage quota and 80 MB was consumed from the backup resource usage quota (880 MB total). SMF 135 may provide the indication that 800 MB was consumed from the primary resource usage quota as part of operation 285 because SMF 135 was unable to provide this indication previously (e.g., during operation 250). For example, SMF 135 may store this usage report information locally and provide the information in "Commfailurereport" to enable CHF 140 to differentiate the network resource usage during the intermittent network failure from network resource usage during normal operation. Even if the timer for the backup resource usage quota expires, SMF 135 may provide the usage report the CHF 140 eventually.

CHF 140 may use charging data request 400 to subtract the amount of actual resource usage from the next primary resource usage quota. For example, CHF 140 may allot only 920 MB (1 GB-80 MB) in the subsequent primary resource usage quota allotment. This is because 80 MB was already consumed from the backup resource usage quota while SMF 135 was unable to communicate with CHF 140.

Figure 5:
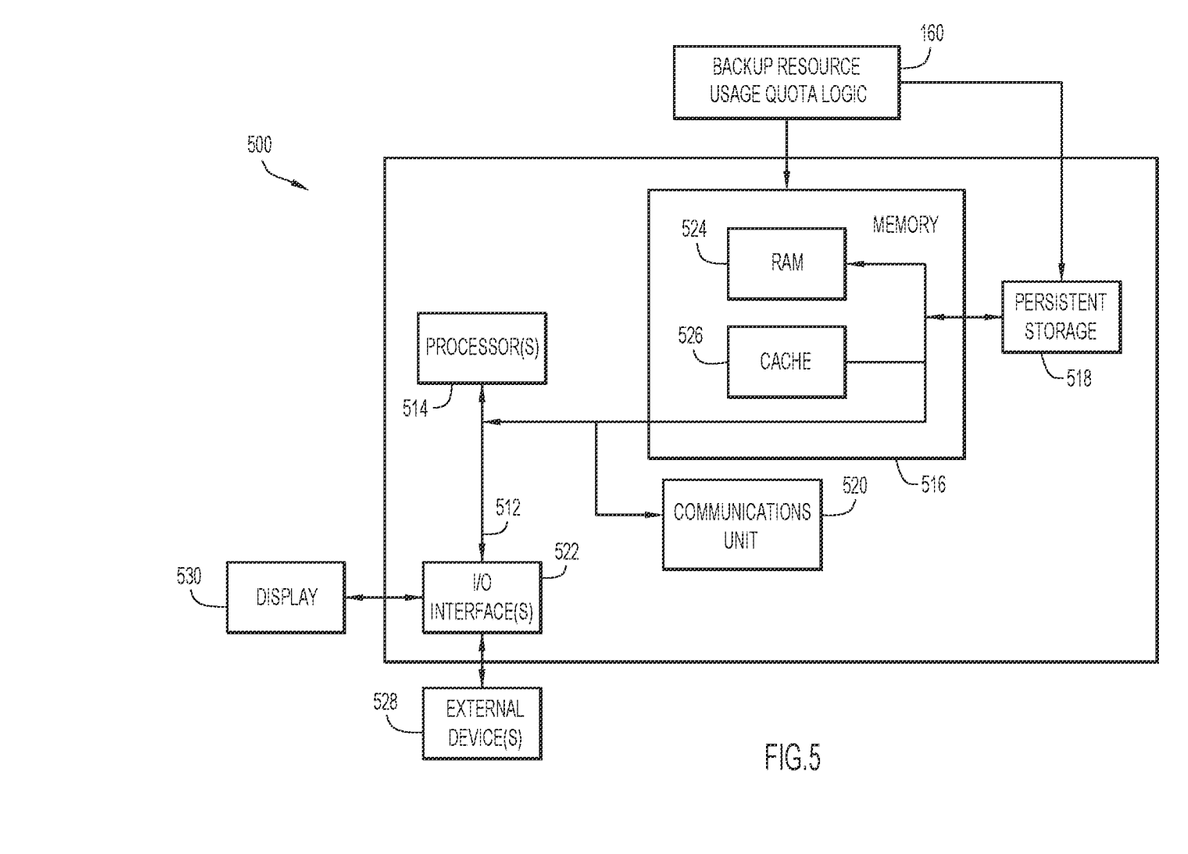
FIG. 5 illustrates a block diagram of a computing device configured to allocate a backup resource usage quota associated with a rating group while the charging function entity is unreachable, according to an example embodiment.

FIG. 5 illustrates a hardware block diagram of an example device 500 (e.g., a server that hosts SMF 135). It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and Input/Output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes Random Access Memory (RAM) 524 and cache memory 526. In general, memory 516 can include any suitable volatile or non-volatile computer readable storage media. Instructions for backup resource usage quota logic 160 may be stored in memory 516 or persistent storage 518 for execution by computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to device 500. For example, I/O interface(s) 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

Figure 6:
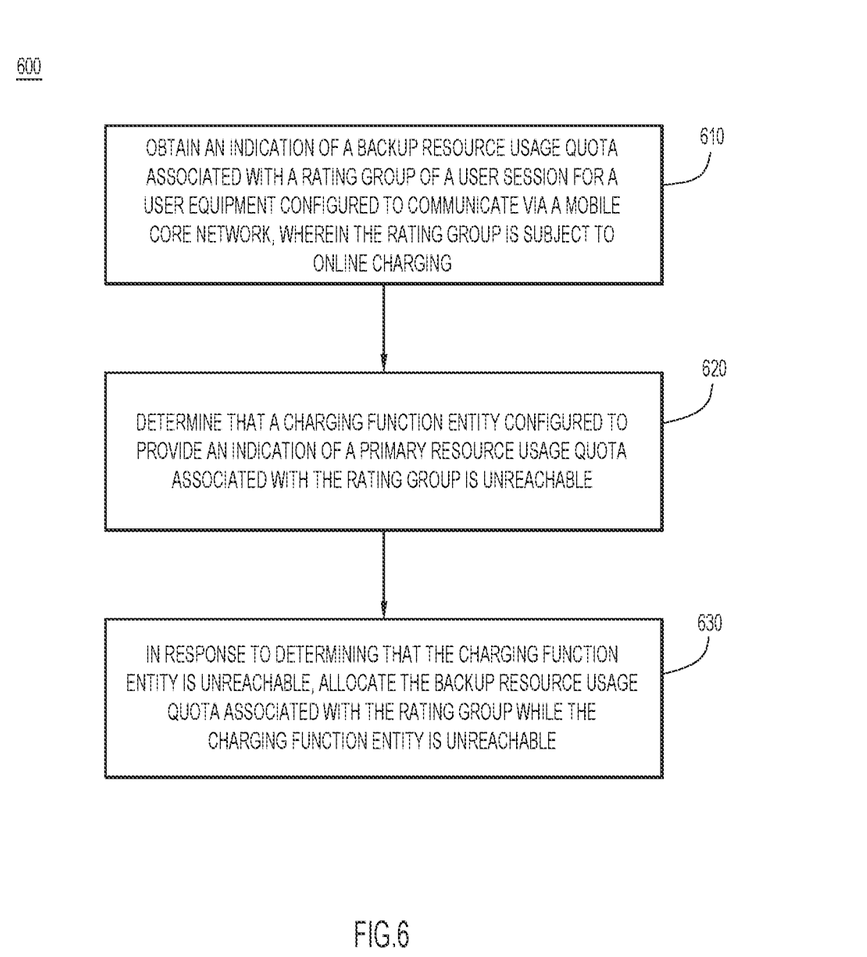
FIG. 6 illustrates a flowchart of a method for allocating a backup resource usage quota associated with the rating group while the charging function entity is unreachable, according to an example embodiment.

FIG. 6 is a flowchart of an example method 600 for allocating a backup resource usage quota associated with a rating group. In one example, SMF 135 may perform method 600. At 610, SMF 135 obtains an indication of a backup resource usage quota associated with a rating group of a user session for a user equipment configured to communicate via a mobile core network, wherein the rating group is subject to online charging. At 620, SMF 135 determines that a charging function entity configured to provide an indication of a primary resource usage quota associated with the rating group is unreachable. At 630, in response to determining that the charging function entity is unreachable, SMF 135 allocates the backup resource usage quota associated with the rating group while the charging function entity is unreachable.

Techniques described herein may enable an SMF to avoid terminating calls due to lack of access to the primary resource usage quota from a CHF in case of intermittent failure due to network congestion, instead providing seamless service to the end user. These techniques may involve the regular introduction of IEs exchanged during session establishment between a CHF and an SMF. For example, the CHF may load the SMF in this manner at the rating group level.

Although examples are provided in relation to 5G cellular technology, it will be appreciated that these techniques may be extended to any suitable networking environment now known or hereinafter developed. For example, the techniques described herein may apply to any charging function entity configured to perform similar operations as a 5G CHF. Similarly, these techniques may also apply to any user plane function entity configured to perform similar operations as a 5G UPF. The approach described herein may be implemented for 4G cellular technology, for example, between a Policy and Charging Enforcement Function (PCEF) and OCS.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining an indication of a backup resource usage quota associated with a rating group of a user session for a user equipment configured to communicate via a mobile core network, wherein the rating group is subject to online charging; determining that a charging function entity configured to provide an indication of a primary resource usage quota associated with the rating group is unreachable; and in response to determining that the charging function entity is unreachable, allocating the backup resource usage quota associated with the rating group while the charging function entity is unreachable.

In one example, obtaining the indication of the backup resource usage quota associated with the rating group includes obtaining the indication of the backup resource usage quota associated with the rating group in a dedicated information element from the charging function entity.

In one example, the method further comprises: determining that a timer for the backup resource usage quota associated with the rating group has expired; and in response to determining that the timer has expired, revoking an allocation of the backup resource usage quota. In a further example, the method comprises obtaining, from the charging function entity, an indication of an expiration of the timer in a dedicated information element.

In one example, the method further comprises: determining that the charging function entity is reachable; and providing, to the charging function entity, an indication of an amount of actual resource usage under the backup resource usage quota associated with the rating group. In a further example, the method comprises: obtaining an indication that the amount of the actual resource usage is equal to or greater than a threshold amount of resource usage, wherein determining that the charging function entity is reachable includes: providing a charging data request to the charging function entity in response to obtaining the indication that the amount of the actual resource usage is equal to or greater than the threshold amount of the resource usage; and obtaining a charging data response from the charging function entity. In another further example, providing the indication of the amount of the actual resource usage includes providing the indication of the amount of the actual resource usage in a dedicated information element.

In one example, the rating group is one of a plurality of rating groups of the user session, and wherein the backup resource usage quota associated with the rating group is one of a plurality of backup resource usage quotas associated respectively with the plurality of rating groups.

In one example, allocating the backup resource usage quota associated with the rating group includes providing, to a user plane function entity, an indication of the backup resource usage quota associated with the rating group.

In another form, an apparatus is provided. The apparatus comprises: a network interface configured to obtain or provide network communications; and one or more processors coupled to the network interface, wherein the one or more processors are configured to: obtain an indication of a backup resource usage quota associated with a rating group of a user session for a user equipment configured to communicate via a mobile core network, wherein the rating group is subject to online charging; determine that a charging function entity configured to provide an indication of a primary resource usage quota associated with the rating group is unreachable; and in response to determining that the charging function entity is unreachable, allocate the backup resource usage quota associated with the rating group while the charging function entity is unreachable.

In another form, one or more non-transitory computer readable storage media are provided. The non-transitory computer readable storage media are encoded with instructions that, when executed by a processor, cause the processor to: obtain an indication of a backup resource usage quota associated with a rating group of a user session for a user equipment configured to communicate via a mobile core network, wherein the rating group is subject to online charging; determine that a charging function entity configured to provide an indication of a primary resource usage quota associated with the rating group is unreachable; and in response to determining that the charging function entity is unreachable, allocate the backup resource usage quota associated with the rating group while the charging function entity is unreachable.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining an indication of a backup resource usage quota associated with a rating group of a user session for a user equipment configured to communicate via a mobile core network, wherein the rating group is subject to online charging and is one of a plurality of rating groups of the user session, and wherein the backup resource usage quota associated with the rating group is one of a plurality of backup resource usage quotas associated respectively with the plurality of rating groups;
determining that a charging function entity configured to provide an indication of a primary resource usage quota associated with the rating group is unreachable; and
in response to determining that the charging function entity is unreachable, allocating the backup resource usage quota associated with the rating group while the charging function entity is unreachable.

2. The method of claim 1, wherein obtaining the indication of the backup resource usage quota associated with the rating group includes obtaining the indication of the backup resource usage quota associated with the rating group in a dedicated information element from the charging function entity.

3. The method of claim 1, further comprising:
determining that a timer for the backup resource usage quota associated with the rating group has expired; and
in response to determining that the timer has expired, revoking an allocation of the backup resource usage quota.

4. The method of claim 3, further comprising:
obtaining, from the charging function entity, an indication of an expiration of the timer in a dedicated information element.

5. The method of claim 1, further comprising:
determining that the charging function entity is reachable; and
providing, to the charging function entity, an indication of an amount of actual resource usage under the backup resource usage quota associated with the rating group.

6. The method of claim 5, further comprising:
obtaining an indication that the amount of the actual resource usage is equal to or greater than a threshold amount of resource usage, wherein
determining that the charging function entity is reachable includes:
providing a charging data request to the charging function entity in response to obtaining the indication that the amount of the actual resource usage is equal to or greater than the threshold amount of the resource usage; and
obtaining a charging data response from the charging function entity.

7. The method of claim 5, wherein providing the indication of the amount of the actual resource usage includes providing the indication of the amount of the actual resource usage in a dedicated information element.

8. The method of claim 1, wherein allocating the backup resource usage quota associated with the rating group includes providing, to a user plane function entity, an indication of the backup resource usage quota associated with the rating group.

9. An apparatus comprising:
a network interface configured to obtain or provide network communications; and
one or more processors coupled to the network interface, wherein the one or more processors are configured to:
obtain an indication of a backup resource usage quota associated with a rating group of a user session for a user equipment configured to communicate via a mobile core network, wherein the rating group is subject to online charging and is one of a plurality of rating groups of the user session, and wherein the backup resource usage quota associated with the rating group is one of a plurality of backup resource usage quotas associated respectively with the plurality of rating groups;
determine that a charging function entity configured to provide an indication of a primary resource usage quota associated with the rating group is unreachable; and
in response to determining that the charging function entity is unreachable, allocate the backup resource usage quota associated with the rating group while the charging function entity is unreachable.

10. The apparatus of claim 9, wherein the one or more processors are configured to:
obtain the indication of the backup resource usage quota associated with the rating group in a dedicated information element from the charging function entity.

11. The apparatus of claim 9, wherein the one or more processors are further configured to:

determine that a timer for the backup resource usage quota associated with the rating group has expired; and in response to determining that the timer has expired, revoke an allocation of the backup resource usage quota.

12. The apparatus of claim 11, wherein the one or more processors are further configured to:

obtain, from the charging function entity, an indication of an expiration of the timer in a dedicated information element.

13. The apparatus of claim 9, wherein the one or more processors are further configured to:

determine that the charging function entity is reachable; and provide, to the charging function entity, an indication of an amount of actual resource usage under the backup resource usage quota associated with the rating group.

14. The apparatus of claim 13, wherein the one or more processors are further configured to:

obtain an indication that the amount of the actual resource usage is equal to or greater than a threshold amount of resource usage;

provide a charging data request to the charging function entity in response to obtaining the indication that the amount of the actual resource usage is equal to or greater than the threshold amount of the resource usage; and obtain a charging data response from the charging function entity.

15. The apparatus of claim 13, wherein the one or more processors are configured to:

provide the indication of the amount of the actual resource usage in a dedicated information element.

16. The apparatus of claim 9, wherein the one or more processors are configured to:

provide, to a user plane function entity, an indication of the backup resource usage quota associated with the rating group.

17. One or more non-transitory computer readable storage media encoded with instructions that, when executed by a processor, cause the processor to:

obtain an indication of a backup resource usage quota associated with a rating group of a user session for a user equipment configured to communicate via a mobile core network, wherein the rating group is subject to online charging and is one of a plurality of rating groups of the user session, and wherein the backup resource usage quota associated with the rating group is one of a plurality of backup resource usage quotas associated respectively with the plurality of rating groups;

determine that a charging function entity configured to provide an indication of a primary resource usage quota associated with the rating group is unreachable; and in response to determining that the charging function entity is unreachable, allocate the backup resource usage quota associated with the rating group while the charging function entity is unreachable.

18. The one or more non-transitory computer readable storage media of claim 17, wherein the instructions further cause the processor to:

obtain the indication of the backup resource usage quota associated with the rating group in a dedicated information element from the charging function entity.

19. The one or more non-transitory computer readable storage media of claim 17, wherein the instructions further cause the processor to:

determine that a timer for the backup resource usage quota associated with the rating group has expired; and in response to determining that the timer has expired, revoke an allocation of the backup resource usage quota.

20. The one or more non-transitory computer readable storage media of claim 17, wherein the instructions further cause the processor to:

determine that the charging function entity is reachable; and provide, to the charging function entity, an indication of an amount of actual resource usage under the backup resource usage quota associated with the rating group.

* * * * *